US010286512B2

(12) United States Patent
Suzuki

(10) Patent No.: US 10,286,512 B2
(45) Date of Patent: May 14, 2019

(54) MACHINING SYSTEM INCLUDING ENCLOSURE DEFINING SPACE IN WHICH WORKPIECE IS MACHINED

(71) Applicant: FANUC CORPORATION, Yamanashi (JP)

(72) Inventor: Katsuyoshi Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 171 days.

(21) Appl. No.: 15/358,624

(22) Filed: Nov. 22, 2016

(65) Prior Publication Data

US 2017/0151642 A1 Jun. 1, 2017

(30) Foreign Application Priority Data

Nov. 26, 2015 (JP) ................. 2015-230920

(51) Int. Cl.
| | | |
|---|---|---|
| *B23Q 11/08* | (2006.01) | |
| *B23Q 11/14* | (2006.01) | |
| *B08B 15/02* | (2006.01) | |
| *B08B 15/00* | (2006.01) | |
| *B23Q 7/04* | (2006.01) | |
| *F24F 7/00* | (2006.01) | |

(52) U.S. Cl.
CPC .......... *B23Q 11/0891* (2013.01); *B08B 15/00* (2013.01); *B08B 15/02* (2013.01); *B08B 15/023* (2013.01); *B23Q 7/04* (2013.01); *B23Q 11/148* (2013.01); *F24F 7/00* (2013.01)

(58) Field of Classification Search
CPC combination set(s) only.
See application file for complete search history.

(56) References Cited

U.S. PATENT DOCUMENTS

| 8,025,473 | B2 * | 9/2011 | Asakawa .......... H01L 21/67727 |
| | | | 198/346.2 |
| 2002/0106268 | A1 * | 8/2002 | Ueda ................... G03F 7/70691 |
| | | | 414/217 |
| 2007/0253831 | A1 * | 11/2007 | Lee .......................... F24F 3/161 |
| | | | 417/5 |

FOREIGN PATENT DOCUMENTS

| CN | 101048327 A | 10/2007 |
| JP | 08153697 A | 6/1996 |
| JP | H09139410 A | 5/1997 |
| JP | 11235660 A | 8/1999 |
| JP | 2004255494 A | 9/2004 |
| JP | 2006-192362 A | 7/2006 |
| JP | 2009101473 A | 5/2009 |
| JP | 2010064175 A | 3/2010 |
| JP | 2015093367 A | 5/2015 |

\* cited by examiner

*Primary Examiner* — Gregory L Huson
*Assistant Examiner* — Elizabeth M. May
(74) *Attorney, Agent, or Firm* — RatnerPrestia

(57) ABSTRACT

A machining system capable of preventing mist from leaking out from an enclosure to the outside. The machining system includes a first enclosure including an opening and configured to define a first space in which a workpiece is processed, a second enclosure arranged adjacent to the first enclosure and configured to define a second space communicating with the first space through the opening, wherein a robot which can advance to and retreat from the first space through the opening is installed in the second space, and a pressure adjustment device configured to increase a pressure in the second space higher than a pressure in the first space.

5 Claims, 8 Drawing Sheets

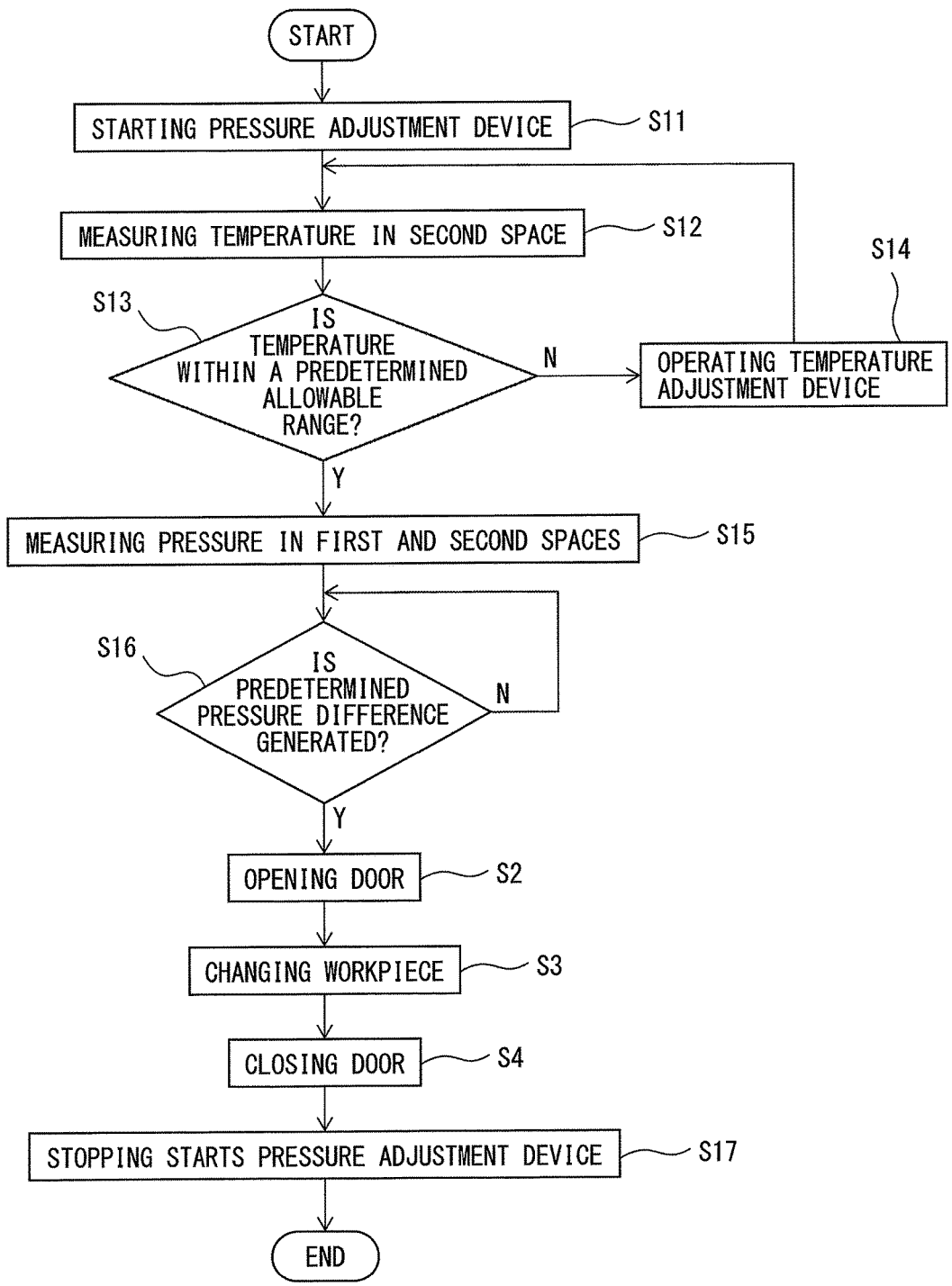

MACHINING SYSTEM INCLUDING ENCLOSURE DEFINING SPACE IN WHICH WORKPIECE IS MACHINED

BACKGROUND OF THE INVENTION

1. Field of the Invention

The invention relates to a machining system including an enclosure defining a space in which a workpiece is machined.

2. Description of the Related Art

A technique for sucking mist including a cutting fluid or the like generated in an enclosure by a suction device is disclosed (for example, Japanese Unexamined Patent Publication (Kokai) No. 2006-192362).

Conventionally, a technique for reliably preventing leakage of mist from an enclosure to the outside is desired.

SUMMARY OF THE INVENTION

A machining system of the invention comprises a first enclosure including an opening and defining a first space in which a workpiece is machined, and a second enclosure arranged adjacent to the first enclosure and defining a second space which is in fluid communication with the first space through the opening.

A robot, which can advance to and retreat from the first space through the opening, is installed in the second space. Further, the machining system includes a pressure adjustment device configured to adjust a pressure in the second space to be higher than a pressure in the first space.

The pressure adjustment device may include a gas supply device configured to supply a gas to the second space so as to increase the pressure in the second space. The machining system may further include a temperature adjustment device configured to adjust a temperature of the gas supplied by the gas supply device to the second space.

The machining system may further include a temperature sensor configured to detect a temperature in the second space. The temperature adjustment device may adjust the temperature of the gas supplied to the second space based on the temperature detected by the temperature sensor.

The pressure adjustment device may include an exhaust device configured to exhaust a gas from the first space so as to decrease the pressure in the first space. The second enclosure may include a second opening. The machining system may further comprise a support part provided in the second opening so as to be insertable into and removable from the second space. The support part may be configured to support the workpiece.

The support part may be configured to seal the second opening when the support part is inserted into the second space. The machining system may further include a door configured to open and close the opening, a door drive part configured to drive the door, and a controller configured to control the pressure adjustment device and the door drive part.

The controller may operate the pressure adjustment device so as to adjust the pressure in the second space to be higher than the pressure in the first space, when the door is closed. The controller may operate the door drive part so as to open the door, when the pressure in the second space is higher than the pressure in the first space. The controller may operate the pressure adjustment device during the door is opened.

BRIEF DESCRIPTION OF THE DRAWINGS

The above-described or other objects, features, and advantages of the invention will be clarified by the following description of exemplary embodiments with reference to the attached drawing, in which:

FIG. 9 is a flowchart illustrating an example of an operation flow of the machining system shown in FIG. 6.

DETAILED DESCRIPTION

Figure 1:
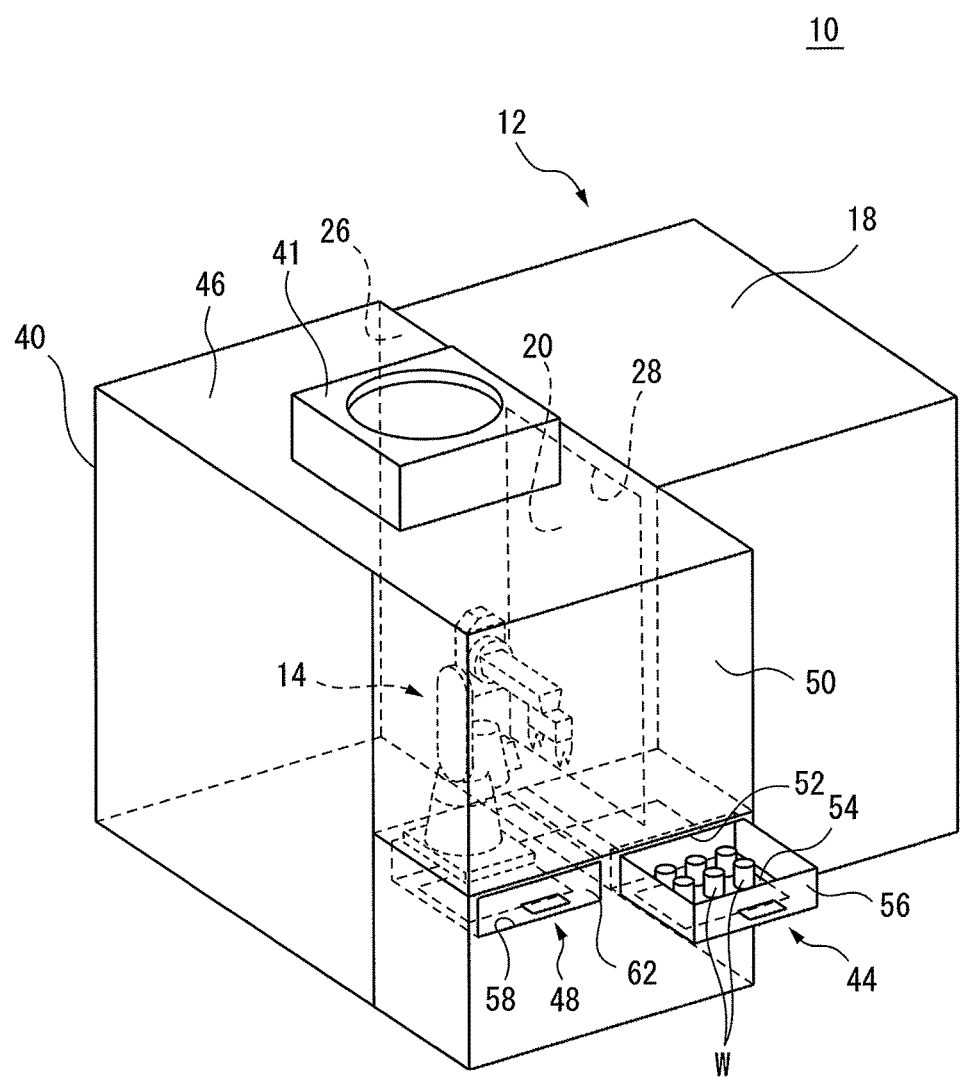
FIG. 1 is a view of a machining system according to an embodiment of the invention.

Embodiments of the invention will be described in detail below based on the drawings. First, a machining system 10 according to an embodiment of the invention will be described with reference to FIG. 1 to FIG. 3. The machining system 10 includes a machining device 12 and a robot 14.

The machining device 12 includes a machining head 15 (FIG. 3), a work table 16 (FIG. 3), a first enclosure 18, a door 20, and a door drive part 22. The machining device 12 can carry out a plurality of types of machining processes, such as milling, boring, and drilling. The machining head 15 includes tools which are automatically changed in response to a machining process to be carried out, and machines a workpiece W placed on the work table 16.

Figure 3:
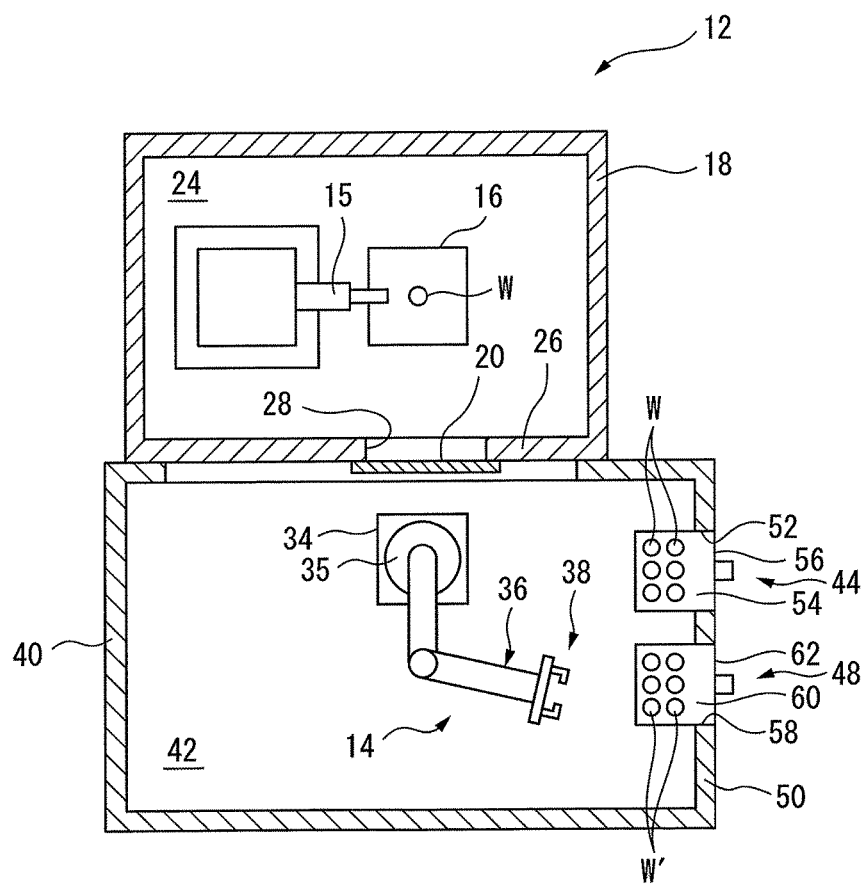
FIG. 3 is a cross-sectional view of the machining system shown in FIG. 1 when cut along a horizontal plane and viewed from upward thereof.

The first enclosure 18 defines a first space 24 (FIG. 3). The machining head 15 and the work table 16 are installed in the first space 24. The workpiece W is machined by the machining head 15 in the first space 24. An opening 28 is formed at a wall 26 of the first enclosure 18 which faces the robot 14.

The door 20 is provided on the wall 26 so as to be slidable along the wall 26. The door 20 slides between an opened position, in which the opening 28 is opened, and a closed position, in which the opening 28 is closed by the door 20.

The door drive part 22 includes a servomotor 30 and an opening and closing mechanism 32. The servomotor 30 includes an output shaft and rotates the output shaft. The opening and closing mechanism 32 includes e.g. a ball screw mechanism, and converts a rotational motion of the output shaft into a reciprocating motion along the wall 26. The door 20 is coupled to the opening and closing mechanism 32, and the servomotor 30 opens and closes the door 20 via the opening and closing mechanism 32 at a speed corresponding to a rotation speed of the output shaft.

The robot 14 is e.g. a vertical articulated robot, and installed adjacent to the wall 26. The robot 14 includes a base 34 fixed on a floor, a revolving drum 35 coupled to the base 34 so as to be rotatable about a vertical axis, a robot arm 36 rotatably coupled to the revolving body 35, and a robot hand 38 provided at a distal end of the robot arm 36.

The robot hand 38 includes a plurality of fingers which are openable and closable, and can grip and releases a workpiece. The robot hand 38 is advanced to and retreated from the first space 24 through the opening 28 by the operation of the robot arm 36.

The machining system 10 further includes a second enclosure 40, a gas supply device 41 (FIG. 1), and support parts 44 and 48. The second enclosure 40 is arranged adjacent to the first enclosure 18, and defines a second space 42 (FIG. 3). The second space 42 is in fluid communication with the first space 24 through the opening 28 when the door 20 is open. The robot 14 is installed in the second space 42.

The gas supply device 41 is installed on an upper wall 46 of the second enclosure 40. The gas supply device 41 includes e.g. an electric fan, and introduces ambient air into the second space 42 through an opening (not shown) formed at the upper wall 46. Thereby, the gas supply device 41 increases a pressure in the second space 42.

The support part 44 is installed in an opening (a second opening) 52 formed at a side wall 50 of the second enclosure 40. The support part 44 includes a bottom plate 54 and a front plate 56 extending upward from a front edge of the bottom plate 54. The front plate has a shape matching with an outer shape of the opening 52.

Figure 2:
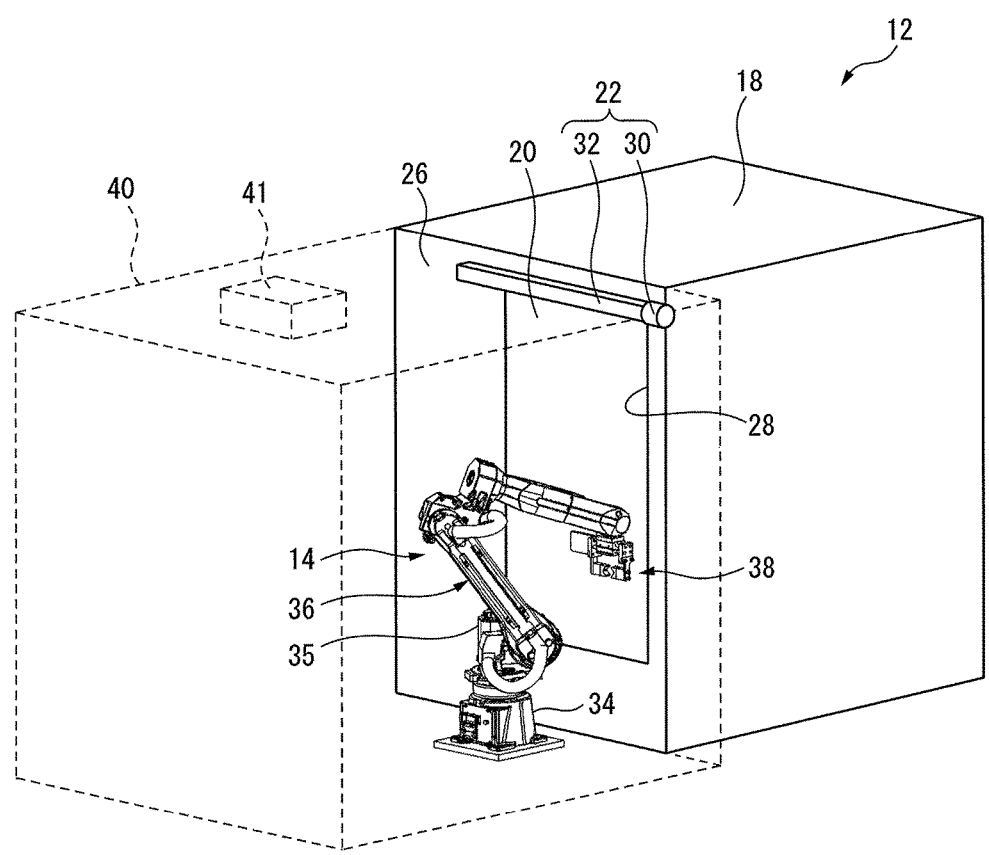
FIG. 2 shows the machining system in FIG. 1 in which the second enclosure is indicated by dotted lines.

The support part 44 is installed in the opening 52 so as to be insertable into and removable from the second space 42. When setting a workpiece W to be machined by the machining device 12 on the work table 16, a user draws the support part 44 out of the second space 42, and places workpieces W to be machined on the bottom plate 54, as shown in FIG. 1.

Then, the user pushes the support part 44 into the second space 42, as shown in FIG. 3. At this time, the front plate 56 air-tightly seals the opening 52. In this way, the workpiece W is introduced into the second space 42 by the user, along with being supported by the support part 44.

The robot 14 grips the workpiece W supported by the support part 44 by the robot hand 38, carries it into the first space 24 through the opening 28 when the door 20 is open, and places it on the work table 16.

The support part 48 has a configuration similar to the support part 44. Specifically, the support part 48 is installed in an opening (a second opening) 58 formed at the side wall 50 so as to be insertable into and removable from the second space 42.

The support part 48 includes a bottom plate 60 on which the workpiece W is placed and a front plate 62 extending upward from a front edge of the bottom plate 60. The front plate 62 has a shape matching with an outer shape of the opening 58. When the support part 48 is inserted into the second space 42 as shown in FIG. 1 and FIG. 3, the front plate 62 air-tightly seals the opening 58.

In this embodiment, a machined workpiece W is placed on the support part 48. Specifically, when taking out the machined workpiece W from the machining device 12, the robot 14 grips the machined workpiece W placed on the work table 16 by the robot hand 38 when the door 20 is open, and takes out it from the first space 24 to the second space 42 through the opening 28.

At this time, the support part 48 is inserted into the second space 42 as shown in FIG. 1 and FIG. 3. The robot 14 places the workpiece W taken out from the first space 24 on the bottom plate 60 of the support part 48. Then, the user draws the support part 48 out of the second space 42, and takes out the machined workpiece W.

When the support parts 44 and 48 are inserted into the second space 42 and the door 20 is open, the first enclosure 18 and the second enclosure 40 define the first space 24 and the second space 42 so as to be air-tightly sealed from the outside.

Figure 4:
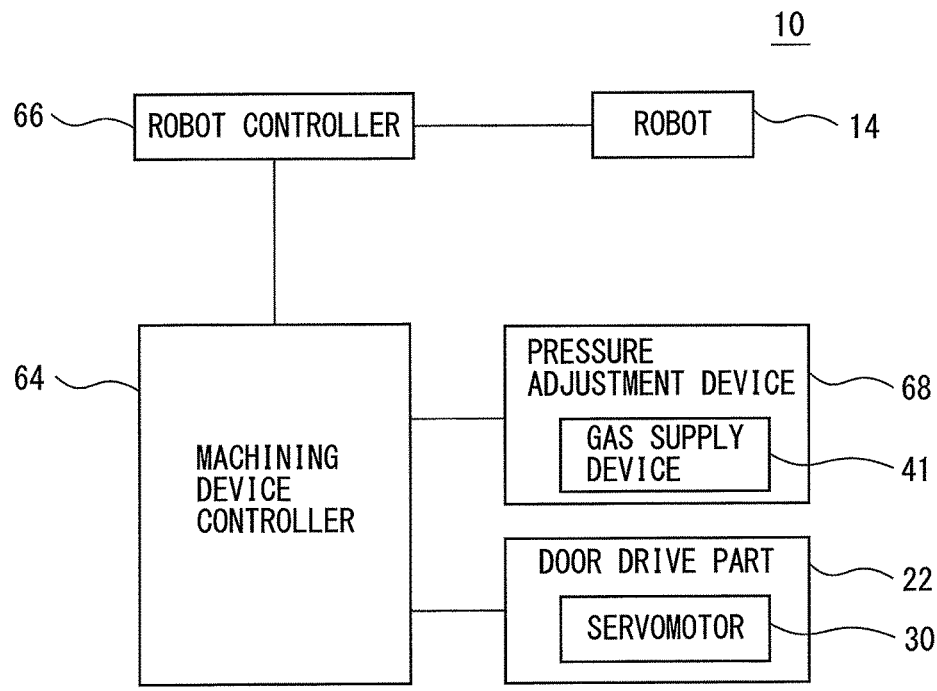
FIG. 4 is a block diagram of the machining system shown in FIG. 1.

FIG. 4 is a block diagram of the machining system 10. The machining system 10 further includes a machining device controller 64 and a robot controller 66. The machining device controller 64 and the robot controller 66 are communicably connected to each other.

The machining device controller 64 includes e.g. a central processing unit (CPU) and a storage, and controls the door drive part 22 and the gas supply device 41. Specifically, the machining device controller 64 transmits a command to the servomotor 30 of the door drive part 22 so as to open and close the door 20. Further, the machining device controller 64 transmits a command to a motor (not shown) built in the gas supply device 41 so as to operate the gas supply device 41 to introduce the ambient air into the second space 42.

The robot controller 66 includes e.g. a CPU and a storage, and transmits a command to each servomotor (not shown) built in the robot 14 so as to operate the robot 14. The machining device controller 64 and the robot controller 66 carry out a workpiece-change process for changing the workpiece W, along with communicating with each other.

Next, the operation of the machining system 10 will be described with reference to FIG. 5. The flow shown in FIG. 5 is started when the machining device controller 64 or the robot controller 66 receives from a user, a host controller, or a machining program, a workpiece-change command for changing the machined workpiece W.

Figure 5:
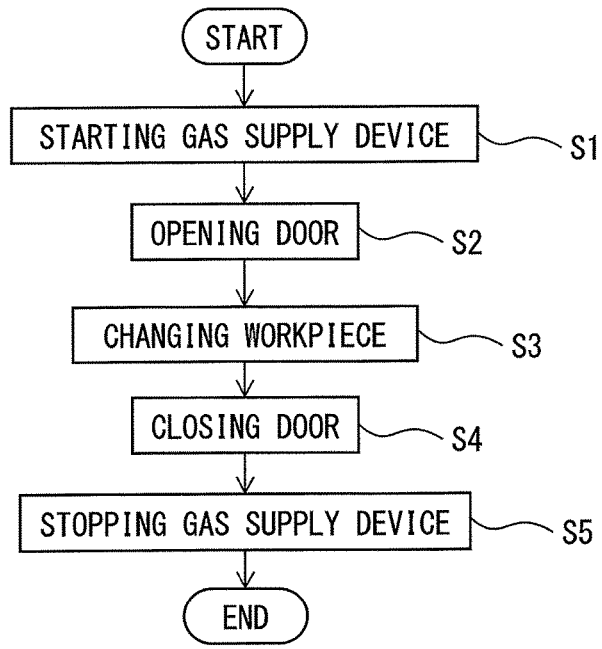
FIG. 5 is a flowchart illustrating an example of an operation flow of the machining system shown in FIG. 1.

When the flow shown in FIG. 5 is started, the door 20 is arranged at the closed position. Further, the support parts 44 and 48 are inserted into the second space 42, thereby the openings 52 and 58 are respectively closed by the front plates 56 and 62.

At step S1, the machining device controller 64 starts the gas supply device 41. Specifically, the machining device controller 64 transmits a command to the motor built in the gas supply device 41 so as to operate the gas supply device 41 to supply the ambient air to the second space 42.

As described above, when step S1 is started, the door 20 is arranged at the closed position. Accordingly, if the gas supply device 41 supplies the ambient air to the second space 42, a pressure $P_2$ in the second space 42 increases.

The gas supply device 41 introduces the ambient air into the second space 42 so that the pressure $P_2$ in the second space 42 is higher than a pressure $P_1$ in the first space 24 (i.e., $P_2>P_1$). Thus, in this embodiment, the gas supply device 41 constitutes a pressure adjustment device 68 (FIG. 4) which adjusts the pressure $P_2$ in the second space 42 to be higher than the pressure $P_1$ in the first space 24.

At step S2, the machining device controller 64 opens the door 20. Specifically, the machining device controller 64 transmits a command to the servomotor 30 of the door drive part 22 so as to move the door 20 from the closed position to the opened position.

As stated above, the pressure $P_2$ in the second space 42 is adjusted to be higher than the pressure $P_1$ in the first space 24 by the gas supply device 41 at step S1. Therefore, when the door 20 is opened at this step S2, an gas flow from the second space 42 into the first space 24 through the opening 28 is generated.

At step S3, the robot controller 66 changes the workpiece W. Specifically, the robot controller 66 operates the robot 14 so as to grip the machined workpiece W placed on the work table 16, then take out it from the first space 24 through the opening 28, and then place it on the bottom plate 60 of the support part 48.

Then, the robot controller 66 operates the robot 14 so as to grip the workpiece W placed on the bottom plate 54 of the support part 44, then carry it into the first space 24 through the opening 28, and then place it on the work table 16. Then, the robot controller 66 retracts the robot 14 from the first space 24 to the second space 42.

At step S4, the machining device controller 64 closes the door 20. Specifically, the machining device controller 64 transmits a command to the servomotor 30 of the door drive part 22 so as to move the door 20 from the opened position to the closed position.

At step S5, the machining device controller 64 stops the gas supply device 41. Specifically, the machining device controller 64 transmits a command to the motor built in the gas supply device 41 so as to stop the gas supply device 41. As a result, the introduction of the ambient air into the second space 42 is stopped.

As described above, in this embodiment, the gas flow from the second space 42 into the first space 24 through the opening 28 is generated when the door 20 is opened at step S2. According to this configuration, it is possible to prevent mist, which includes a cutting fluid or the like generated in the first space 24 when the machining head 15 machines the workpiece W, from leaking out from the first space 24 through the opening 28.

Further, in this embodiment, the machining device controller 64 continuously operates the gas supply device 41 so as to maintain the pressure $P_2$ in the second space 42 to be higher than the pressure $P_1$ in the first space 24, over a period when the door 20 is opened at steps S2 to S4.

According to this configuration, since the gas flow from the second space 42 into the first space 24 through the opening 28 can be continuously generated over the period when the door 20 is opened, it is possible to reliably prevent the mist such as the cutting fluid from leaking out from the first space 24 through the opening 28.

Further, the gas supply device 41 is operated only when the gas flow from the second space 42 into the first space 24 needs to be generated, as a result of which power consumption of the machining system 10 can be reduced.

Further, in this embodiment, supplying the workpiece W to be machined into the second space 42 and taking out the machined workpiece W from the second space 42 can be carried out by means of the support parts 44 and 48 capable of air-tightly sealing the second space 42.

According to this configuration, when step S3 is executed, the second space 42 is maintained in a sealed state, thereby, the gas flow flowing from the second space 42 to the first space 24 through the opening 28 can be effectively generated. On the other hand, a user can easily carry out supplying the workpiece W to be machined into the second space 42 and taking out the machined workpiece W from the second space 42 by the support parts 44 and 48.

Figure 6:
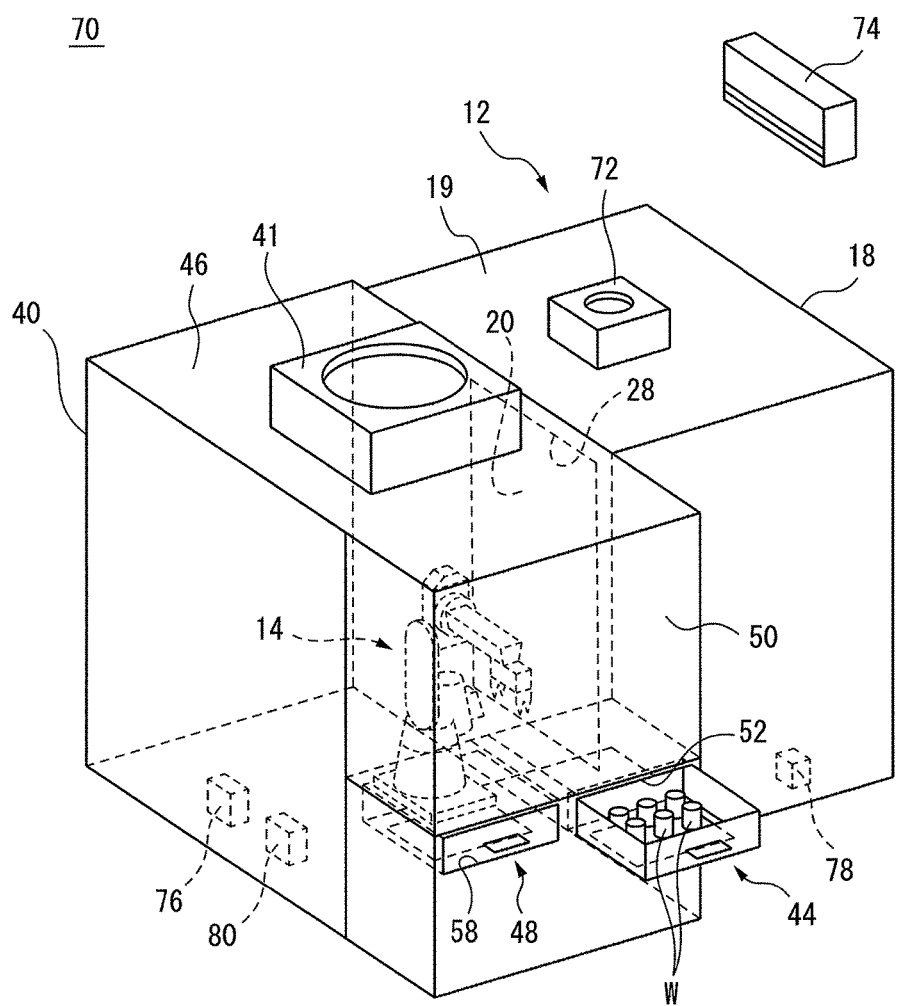
FIG. 6 is a view of a machining system according to another embodiment of the invention.
Figure 7:
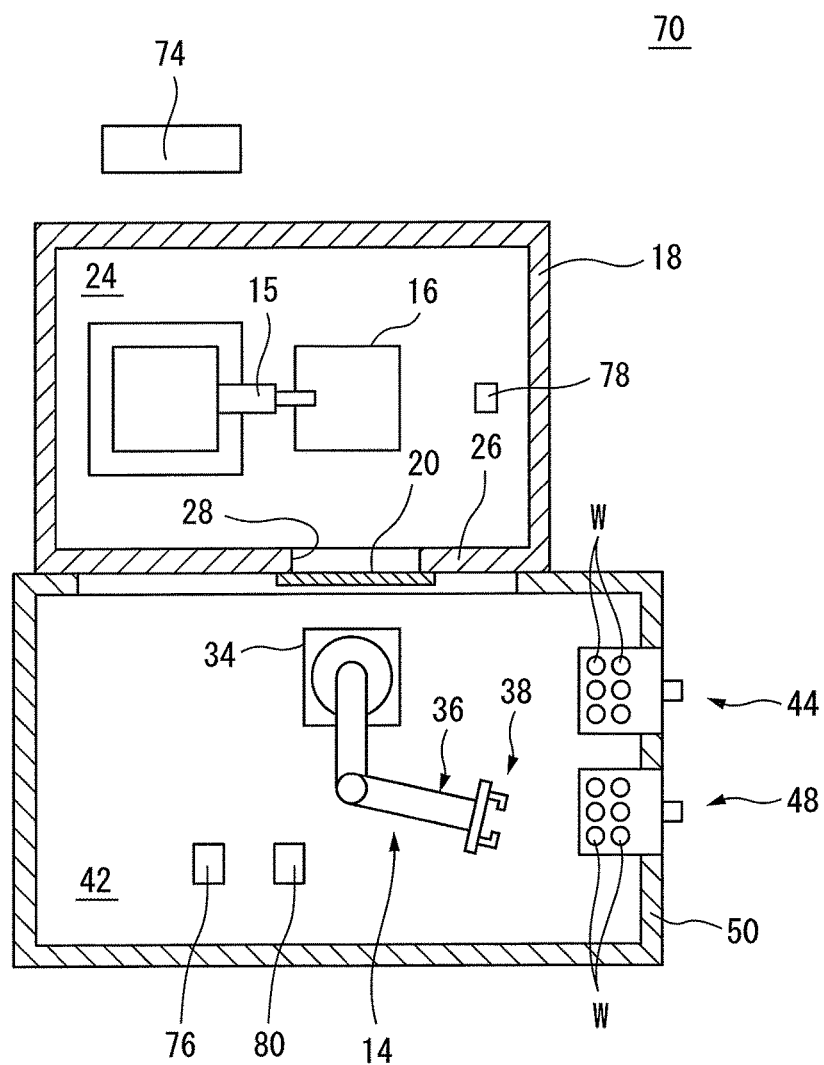
FIG. 7 is a cross-sectional view of the machining system shown in FIG. 6 when cut along a horizontal plane and viewed from upward thereof.

Next, a machining system 70 according to another embodiment will be described with reference to FIG. 6 and FIG. 7. Note that, in various embodiments described below, elements similar to those in the already-described embodiments are assigned the same reference numerals, and detailed descriptions thereof wall be omitted.

The machining system 70 is different from the above-described machining system 10 in following features, wherein the machining system 70 further includes an exhaust device 72, a temperature adjustment device 74, a temperature sensor 76, a first pressure sensor 78, and a second pressure sensor 80.

The exhaust device 72 is installed on an upper wall 19 of the first enclosure 18. The exhaust device 72 includes e.g. an electric fan, and exhausts gas from the first space 24 through an opening (not shown) formed at the upper wall 19. Thus, the exhaust device 72 decreases the pressure in the first space 24.

The temperature adjustment device 74 is e.g. an air conditioner, and adjusts an atmospheric temperature outside of the first enclosure 18 and the second enclosure 40. In this embodiment, the temperature adjustment device 74 is arranged so as to supply a temperature-adjusted gas to the gas supply device 41.

The temperature sensor 76 is installed in the second space 42 so as to measure a temperature in the second space 42. The first pressure sensor 78 is installed in the first space 24 so as to measure the pressure $P_1$ in the first space 24. On the other hand, the second pressure sensor 80 is installed in the second space 42 so as to measure the pressure $P_2$ in the second space 42.

Figure 8:
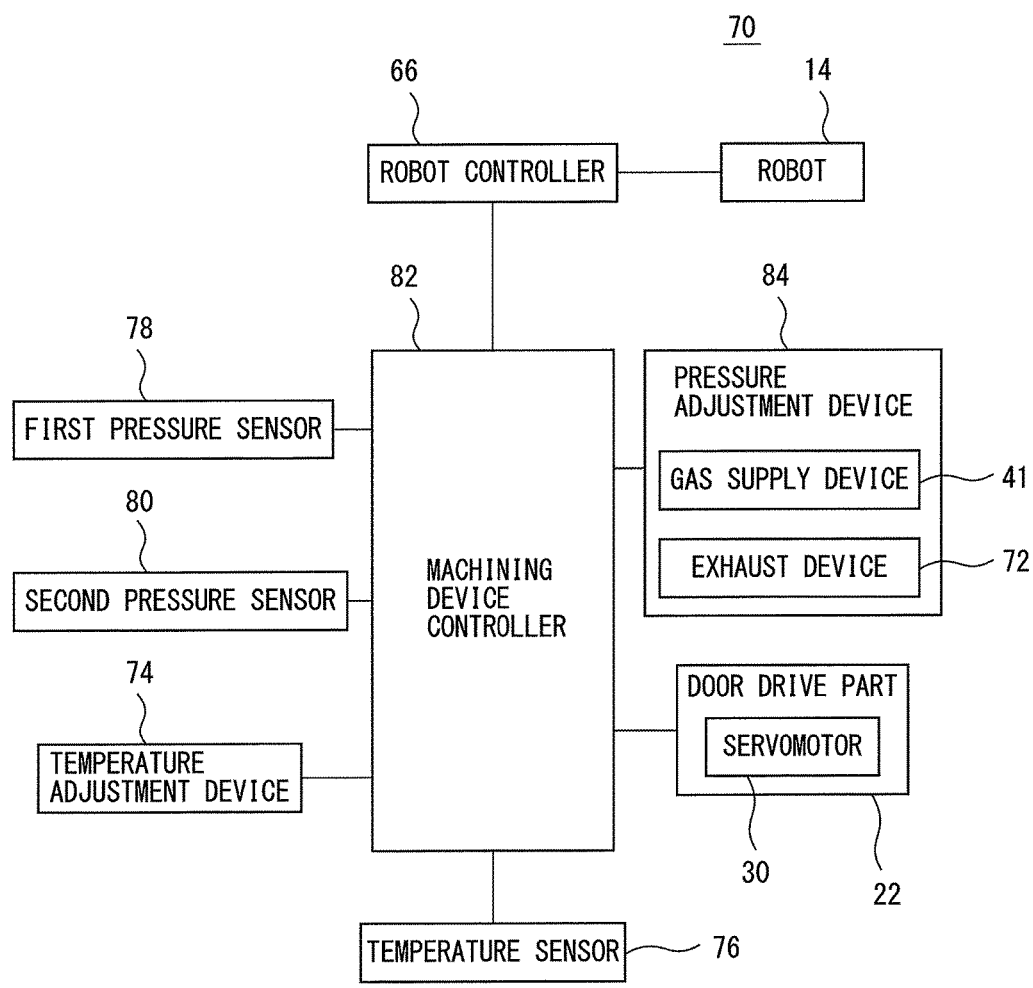
FIG. 8 is a block diagram of the machining system shown in FIG. 6.

FIG. 8 is a block diagram of the machining system 70. The machining system 70 includes a machining device controller 82 and the robot controller 66. The machining device controller 82 and the robot controller 66 are communicably connected to each other.

The machining device controller 82 includes e.g. a CPU and a storage, and controls the door drive part 22, the gas supply device 41, the exhaust device 72, the temperature adjustment device 74, the temperature sensor 76, the first pressure sensor 78, and the second pressure sensor 80.

Specifically, the machining device controller 82 transmits a command to the servomotor 30 of the door drive part 22 so as to open and close the door 20.

Further, the machining device controller 82 transmits a command to the motor (not shown) built in the gas supply device 41 so as to operate the gas supply device 41 to introduce the ambient air into the second space 42.

Further, the machining device controller 82 transmits a command to a motor (not shown) built in the exhaust device 72 so as to operate the exhaust device 72 to exhaust the gas from the first space 24. Further, the machining device controller 82 transmits a command to the temperature adjustment device 74 so as to operate the temperature adjustment device 74 to adjust the atmospheric temperature outside of the first enclosure 18 and the second enclosure 40.

Further, the machining device controller 82 transmits a command to the temperature sensor 76 so as to measure the temperature in the second space 42, and acquires data of the measured temperature from the temperature sensor 76. Further, the machining device controller 82 transmits commands to the first pressure sensor 78 and the second pressure sensor 80 respectively so as to measure the pressures in the first space 24 and the second space 42, and acquires data of the measured pressures from the first pressure sensor 78 and the second pressure sensor 80.

Next, the operation of the machining system 70 will be described with reference to FIG. 9. Note that, in the flow shown in FIG. 9, the processes similar to those in the flow shown in FIG. 5 are assigned the same step numbers, and detailed descriptions thereof will be omitted.

The flow shown in FIG. 9 is started when the machining device controller 82 or the robot controller 66 receives a workpiece change command to change the machined workpiece W from a user, a high-order controller, or a machining program.

When the flow shown in FIG. 9 is started, the door 20 is arranged at the closed position. Further, the support parts 44 and 48 are inserted into the second space 42, thereby the openings 52 and 58 are respectively closed by the front plates 56 and 62.

At step S11, the machining device controller 82 starts the pressure adjustment device. Specifically, the machining device controller 82 transmits a command to the motor built in the gas supply device 41 so as to operate the gas supply device 41 to supply the ambient air to the second space 42. Simultaneously, the machining device controller 82 transmits a command to the motor (not shown) built in the exhaust device 72 so as to operate the exhaust device 72 to exhaust the gas from the first space 24.

As described above, at the start of this step S1, the door 20 is arranged at the closed position. Therefore, if the gas supply device 41 supplies the ambient air to the second space 42 and the exhaust device 72 exhausts the gas from the first space 24, the pressure $P_2$ in the second space 42 increases with respect to the pressure $P_1$ in the first space 24.

The gas supply device 41 supplies the ambient air to the second space 42 and the exhaust device 72 exhausts the gas from the first space 24 so that the pressure $P_2$ in the second space 42 is higher than the pressure $P_1$ in the first space 24. Thus, in this embodiment, the gas supply device 41 and the exhaust device 72 constitute a pressure adjustment device 84 (FIG. 8) which adjusts the pressure $P_2$ in the second space 42 to be higher than the pressure $P_1$ in the first space 24.

At step S12, the machining device controller 82 measures a temperature in the second space 42. Specifically, the machining device controller 82 transmits a command to the temperature sensor 76 so as to measure a temperature T in the second space 42, and acquires data of the measured temperature T from the temperature sensor 76.

At step S13, the machining device controller 82 determines whether the temperature T in the second space 42 acquired at step S12 is within a predetermined allowable range $[T_1, T_2]$. The allowable range is pre-set by a user depending on the machining process to be executed in the first space 24, and stored in the storage.

When the temperature T is within the allowable range (i.e., $T_1 \leq T \leq T_2$), the machining device controller 82 determines as "YES", and proceeds to step S15. On the other hand, when the temperature T is out of the allowable range (i.e., $T<T_1$ or $T_2<T$), the machining device controller 82 determines as "NO", and proceeds to step S14.

At step S14, the machining device controller 82 transmits a command to the temperature adjustment device 74 so as to operate the temperature adjustment device 74. As an example, if it is determined that the temperature T is lower than the threshold value $T_1$ at step S13 (i.e., $T<T_1$), the temperature adjustment device 74 warms an atmosphere outside of the first enclosure 18 and the second enclosure 40.

On the other hand, if it is determined that the temperature T is higher than the threshold value $T_2$ at step S13 (i.e., $T_2<T$), the temperature adjustment device 74 cools the atmosphere outside of the first enclosure 18 and the second enclosure 40.

By warming or cooling the external atmosphere as described above, the temperature of the ambient air to be introduced into the second space 42 by the gas supply device 41 is increased or decreased, as a result of which, the temperature in the second space 42 can be increased or decreased. In this way, the temperature adjustment device 74 adjusts the temperature of the gas to be supplied to the second space 42 by the gas supply device 41.

At step S15, the machining device controller 82 measures the pressure $P_1$ in the first space 24 and the pressure $P_2$ in the second space 42. Specifically, the machining device controller 82 transmits commands to the first pressure sensor 78 and the second pressure sensor 80 respectively so as to measure the pressure $P_1$ and the pressure $P_2$, and acquires data of the measured pressures.

At step S16, the machining device controller 82 determines whether a predetermined pressure difference $\delta P$ is generated between the first space 24 and the second space 42. Specifically, the machining device controller 82 calculates a difference $\delta P (=P_2-P_1)$ between the pressure $P_1$ and the pressure $P_2$ acquired at step S15.

Then, the machining device controller 82 determines whether the calculated difference $\delta P$ exceeds a predetermined threshold value $\alpha$ (i.e., $\delta P \geq \alpha$). The threshold value $\alpha$ is predetermined by a user as a value for which a sufficient gas flow from the second space 42 to the first space 24 through the opening 28 can be generated when the door 20 is opened. The threshold value $\alpha$ is stored in the storage.

When the difference $\delta P$ exceeds the threshold value $\alpha$, the machining device controller 82 determines as "YES", and proceeds to step S2. On the other hand, when the difference $\delta P$ does not exceed the threshold value $\alpha$ (i.e., $\delta P < \alpha$), the machining device controller 82 determines as "NO", and repeats step S16.

After determining as "YES" at step S16, the machining device controller 82 or the robot controller 66 carries out steps S2 to S4 similar to those in the flow shown in FIG. 5.

After step S4, at step S17, the machining device controller 82 stops the pressure adjustment device 84. Specifically, the machining device controller 82 transmits commands to the gas supply device 41 and the exhaust device 72 so as to stop the gas supply device 41 and the exhaust device 72.

In this embodiment, at step S11, the pressure $P_2$ in the second space 42 is maintained to be higher than the pressure $P_1$ in the first space 24 by the pressure adjustment device 84. Therefore, when the door 20 is opened at step S2, the gas flow from the second space 42 to the first space 24 through the opening 28 is generated.

According to this configuration, it is possible to prevent mist, which includes a cutting fluid or the like generated in the first space 24 when the machining head 15 machines the workpiece W, from leaking out from the first space 24 through the opening 28.

Further, in this embodiment, the pressure adjustment device 84 is constituted by the gas supply device 41 and the exhaust device 72. According to this configuration, it is possible to quickly change the pressure $P_2$ with respect to the pressure $P_1$ so that the pressure $P_2$ gets higher than the pressure $P_1$.

Further, in this embodiment, when the temperature T in the second space 42 is out of the allowable range (i.e., determined as "NO" at step S13), the temperature of the gas supplied to the second space 42 (i.e., the temperature T in the second space 42) is adjusted by the temperature adjustment device 74 depending on the machining process to be executed in the first space 24.

According to this configuration, even if the door 20 is opened at step S2, the temperature in the first space 24 can be appropriately adjusted depending on the machining process, and therefore the accuracy of the machining process can be maintained.

Further, in this embodiment, the door 20 is opened (step S2) when the predetermined pressure difference $\delta P$ is formed between the first space 24 and the second space 42 (i.e., determined as "YES" at step S16).

According to this configuration, when the door 20 is opened at step S2, a sufficient gas flow from the second space 42 to the first space 24 through the opening 28 can be generated, and therefore, it is possible to more effectively prevent the mist including a cutting fluid or the like from leaking out from the first space 24.

Note that, at step S16 shown in FIG. 9, the machining device controller 82 may determine whether the pressure difference δP is formed between the first space 24 and the second space 42, based on an elapsed time from a time point when step S11 is started.

As an example, the machining device controller 82 includes a timer configured to time an elapsed time from a predetermined time point, and times an elapsed time t from a time point when a command is transmitted to the gas supply device 41 or the exhaust device 72 at step S11.

Then, at step S16, the machining device controller 82 determines whether the elapsed time t timed by the timer reaches a predetermined time $t_1$. The predetermined time $t_1$ is predetermined by a user so as to enable the pressure difference δP to be sufficiently formed after the pressure adjustment device 84 is activated, and stored in the storage.

When the elapsed time t reaches the predetermined time $t_1$, the machining device controller 82 determines as "YES", and proceeds to step S2. On the other hand, when the elapsed time t does not reach the predetermined time $t_1$, the machining device controller 82 determines as "NO", and repeats step S16.

Further, in the above-described embodiments, the gas supply device 41 supplies the ambient air to the second space 42. However, the gas supply device may supply a certain type of gas to the second space 42.

In this case, the gas supply device may include a reservoir for reserving the certain type of gas, a pump for pumping the gas from the reservoir, and a ventilation duct for introducing the gas pumped from the pump into the second space 42. The ventilation duct may have an opening at any position in the second space 42.

Further, in the machining system 10 shown in FIG. 1, the gas supply device 41 may be omitted, and the above-described exhaust device 72 may be installed in the first enclosure 18. In this case, at steps S1 and S5 in FIG. 5, the machining device controller 64 starts and stops the exhaust device 72.

The invention is described above through the exemplary embodiments of the invention, however, the above-described exemplary embodiments are not meant to limit the scope of the invention. Further, exemplary embodiments as combinations of the features described in the exemplary embodiments of the invention can be included in the technical scope of the invention, however, all of the combinations of the features are not always indispensable to the means for solution according to the invention. Furthermore, it will be obvious to a person skilled in the art that various modifications and improvements can be made to the above-described exemplary embodiments.

Further, it is to be noted that the execution order of each processing in the operations, procedures, steps, processes, stages, and the like of the apparatuses, systems, programs, and methods described in the scope of claims, the specification, and the drawings can be realized in an arbitrary order as long as it is not especially and expressly described as "previous to", "prior to", and the like, and an output of former processing is not used in latter processing. Regarding the scope of claims, the specification, and the operation flows in the drawings, if "first", "next", "then", and the like are used in the description for convenience sake, these expressions do not mean that the implementation in this order is indispensable.

The invention claimed is:

1. A machining system comprising:
   a machining head configured to machine a workpiece using a cutting fluid;
   a first enclosure arranged so as to enclose the machining head, the first enclosure including an opening and defining a first space in which the machining head is installed and the workpiece is machined by the machining head;
   a second enclosure arranged adjacent to the first enclosure and defining a second space which is in fluid communication with the first space through the opening, wherein a robot which can advance to and retreat from the first space through the opening is installed in the second space;
   a pressure adjustment device configured to adjust a pressure in the second space to be higher than a pressure in the first space, the pressure adjustment device including a gas supply device configured to supply a gas to the second space so as to increase the pressure in the second space;
   a temperature sensor configured to detect a temperature in the second space; and
   a temperature adjustment device configured to adjust a temperature of the gas supplied by the gas supply device to the second space, based on the temperature detected by the temperature sensor.

2. The machining system according to claim 1, wherein the pressure adjustment device further includes an exhaust device configured to exhaust a gas from the first space so as to decrease the pressure in the first space.

3. The machining system according to claim 1 further comprising:
   a door configured to open and close the opening;
   a door drive part configured to drive the door; and
   a controller configured to control the pressure adjustment device and the door drive part,
   wherein the controller operates the pressure adjustment device so as to adjust the pressure in the second space to be higher than the pressure in the first space, when the door is closed, and
   wherein the controller operates the door drive part so as to open the door, when the pressure in the second space is higher than the pressure in the first space.

4. The machining system according to claim 3, wherein the controller operates the pressure adjustment device while the door is opened.

5. A machining system comprising:
   a machining head configured to machine a workpiece using a cutting fluid;
   a first enclosure arranged so as to enclose the machining head, the first enclosure including an opening and defining a first space in which the machining head is installed and the workpiece is machined by the machining head;
   a second enclosure including a second opening and arranged adjacent to the first enclosure, the second enclosure defining a second space which is in fluid communication with the first space through the opening, wherein a robot which can advance to and retreat from the first space through the opening is installed in the second space;

a pressure adjustment device configured to adjust a pressure in the second space to be higher than a pressure in the first space; and a support part provided in the second opening so as to be insertable into and removable from the second space, the support part being configured to support the workpiece and seal the second opening when the support part is inserted into the second space.

\* \* \* \* \*